(12) United States Patent
Wieskamp et al.

(10) Patent No.: US 9,764,741 B2
(45) Date of Patent: Sep. 19, 2017

(54) OPERATOR SKILL SCORING BASED ON COMPARISON TO AUTOMATED VEHICLE OPERATION

(71) Applicant: Delphi Technologies, Inc., Troy, MI (US)

(72) Inventors: Jonathan L. Wieskamp, Santa Clara, CA (US); Brian R. Hilnbrand, Mountain View, CA (US); Nathan A. Pendleton, San Jose, CA (US); Nandita Mangal, Palo Alto, CA (US)

(73) Assignee: Delphi Technologies, Inc., Troy, MI (US)

( * ) Notice: Subject to any disclaimer, the term of this patent is extended or adjusted under 35 U.S.C. 154(b) by 58 days.

(21) Appl. No.: 15/007,283

(22) Filed: Jan. 27, 2016

(65) Prior Publication Data

US 2017/0210388 A1 Jul. 27, 2017

(51) Int. Cl.

| B60W 40/09 | (2012.01) |
|---|---|
| B60C 23/04 | (2006.01) |
| G07C 5/00 | (2006.01) |
| B60N 2/02 | (2006.01) |
| B60N 2/14 | (2006.01) |
| B60C 19/00 | (2006.01) |

(Continued)

(52) U.S. Cl.
CPC ............ B60W 40/09 (2013.01); *B60C 1/00* (2013.01); *B60C 11/24* (2013.01); *B60C 19/00* (2013.01); *B60C 23/041* (2013.01); *B60K 1/04* (2013.01); *B60N 2/02* (2013.01); *B60N 2/14* (2013.01); *B60W 50/08* (2013.01); *B60W 2550/10* (2013.01); *B60W 2550/22* (2013.01); *B60W 2550/30* (2013.01); *G06F 7/00* (2013.01); *G06F 19/00* (2013.01); *G07C 5/008* (2013.01); *G08B 13/14* (2013.01); *H04M 1/7253* (2013.01)

(58) Field of Classification Search
CPC .......... B60N 2/02; B60N 2/14; B60W 50/08; B60W 40/09; B60W 2550/10; B60W 2550/30; B60K 1/04; H04M 1/7253; G06F 7/00; G06F 19/00; B60C 11/24; B60C 19/00; B60C 23/0425; B60C 23/005; B60C 23/041; B60C 23/0408; G07C 5/008
See application file for complete search history.

(56) References Cited

U.S. PATENT DOCUMENTS

| 7,672,756 | B2 * | 3/2010 | Breed | G07C 5/008 701/1 |
|---|---|---|---|---|
| 7,786,864 | B1 * | 8/2010 | Shostak | B60C 23/041 340/539.1 |

(Continued)

FOREIGN PATENT DOCUMENTS

WO 94/19705 A1 1/1994

*Primary Examiner* — Behrang Badii
(74) *Attorney, Agent, or Firm* — Lawrence D. Hazelton

(57) ABSTRACT

A skill-scoring system suitable for use on an automated vehicle includes an accelerometer and a controller. The accelerometer is used to determine an acceleration-value experienced by an operator of a host-vehicle while the operator operates the host-vehicle in a manual-mode along a travel-path. The controller is in communication with the accelerometer. The controller is configured to determine a skill-score based on a comparison of the acceleration-value to an expected-acceleration that the operator would experience when the host-vehicle is operated in an automated-mode along the travel-path.

7 Claims, 4 Drawing Sheets

(51) Int. Cl.

| | |
|---|---|
| *G08B 13/14* | (2006.01) |
| *B60K 1/04* | (2006.01) |
| *G06F 7/00* | (2006.01) |
| *B60C 11/24* | (2006.01) |
| *H04M 1/725* | (2006.01) |
| *B60W 50/08* | (2012.01) |
| *G06F 19/00* | (2011.01) |
| *B60C 1/00* | (2006.01) |

(56) References Cited

U.S. PATENT DOCUMENTS

| | | | |
|---|---|---|---|
| 2006/0212194 A1* | 9/2006 | Breed | G07C 5/008 |
| | | | 701/1 |
| 2008/0162027 A1 | 7/2008 | Murphy et al. | |
| 2010/0207754 A1* | 8/2010 | Shostak | B60C 23/041 |
| | | | 340/450 |
| 2011/0184617 A1 | 7/2011 | Hegemann et al. | |
| 2014/0372017 A1 | 12/2014 | Armitage | |
| 2015/0046197 A1 | 2/2015 | Peng et al. | |
| 2016/0264021 A1* | 9/2016 | Gillett | B60K 1/04 |

* cited by examiner

OPERATOR SKILL SCORING BASED ON COMPARISON TO AUTOMATED VEHICLE OPERATION

TECHNICAL FIELD OF INVENTION

This disclosure generally relates to a skill-scoring system suitable for use on an automated vehicle, and more particularly relates to a system that determines a skill-score based on a comparison of the accelerations of a host-vehicle when an operator drives the host-vehicle in a manual-mode to accelerations when the host-vehicle is operated in an automated-mode.

BACKGROUND OF INVENTION

Some vehicle operators (i.e. drivers) exhibit less than desirable driving skills such as frequent speed changes and erratic steering. Remarks by passengers that such driving skills need to be improved may be ignored and/or cause offense. What is needed is an impartial observer that provides a measurement of an operator's driving skills.

SUMMARY OF THE INVENTION

In accordance with one embodiment, a skill-scoring system suitable for use on an automated vehicle is provided. The system includes an accelerometer and a controller. The accelerometer is used to determine an acceleration-value experienced by an operator of a host-vehicle while the operator operates the host-vehicle in a manual-mode along a travel-path. The controller is in communication with the accelerometer. The controller is configured to determine a skill-score based on a comparison of the acceleration-value to an expected-acceleration that the operator would experience when the host-vehicle is operated in an automated-mode along the travel-path.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
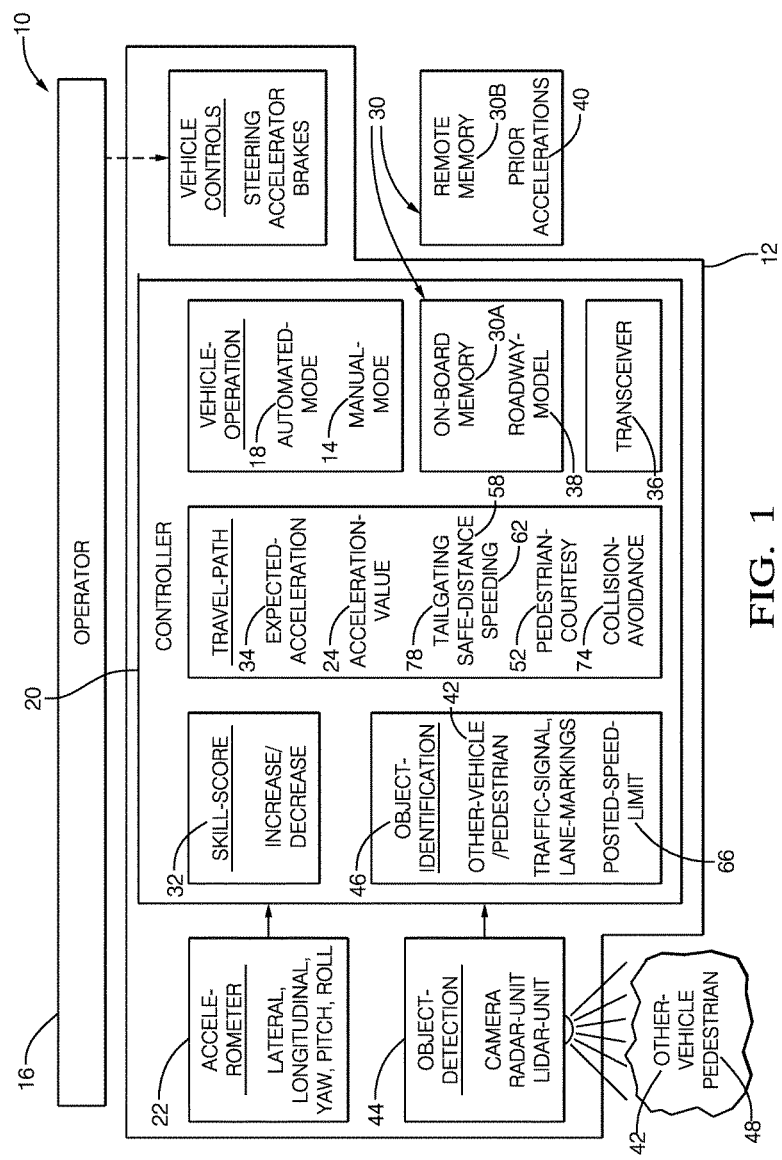
FIG. 1 is a diagram of a skill-scoring system in accordance with one embodiment.

FIG. 1 illustrates a non-limiting example of a skill-scoring system 10, hereafter referred to as the system 10, which is suitable for use on an automated vehicle 12, hereafter referred to as the host-vehicle 12. The host-vehicle 12 is generally configured to be operated in, but not limited to, a manual-mode 14 where an operator 16 manually operates vehicle inputs to control the steering, accelerator, and brakes of the host-vehicle 12, and an automated-mode 18 (i.e. autonomous operation) where the operator 16 is little more than a passenger of the host-vehicle and a controller 20 has control of the steering, accelerator, and brakes of the host-vehicle 12. As will be explained in more detail below, the skill-scoring aspect of the system 10 is intended to provide a means for improving the manual driving habits of the operator 16 by comparing the motion or operation of the host-vehicle 12 when operated in the manual-mode by the operator 16 to the motion or operation of the host-vehicle 12 when operated in the automated-mode by the controller 20.

The system 10 includes an accelerometer 22 used to determine an acceleration-value 24 experienced by the operator 16 or passenger of a host-vehicle 12 as the host-vehicle travels along a travel-path 26. As used herein, the acceleration-value 24 may characterize any type of change in velocity, i.e. a change in speed and/or change in direction of the host-vehicle 12. That is, braking or slowing the speed of the host-vehicle 12 may be characterized by the acceleration-value 24 just as accelerating or increasing the speed of the host-vehicle 12 and/or steering the host-vehicle to change direction may be characterized by the acceleration-value 24. Accordingly, the accelerometer 22 may include, but is not limited to, the means to measure or detect lateral acceleration, longitudinal acceleration, and/or changes in the yaw, pitch, and/or roll angles of the host-vehicle 12. As such, the acceleration-value 24 may include or tally the effects of, for example, longitudinal acceleration caused by undesirable variations in speed, lateral acceleration caused by frequent steering corrections, and/or combinations or sequences thereof.

As used herein, the travel-path 26 will typically be a roadway 28 (FIGS. 2-4) with relatively well defined boundaries that determine the shape of the travel-path 26. However, off-road scenarios such mining or farming operations are envisioned where skill-scoring of an operator may be helpful to improve operational efficiency. As will become apparent in the description that follows, the acceleration-value 24 is of particular interest while the operator 16 operates the host-vehicle 12 in the manual-mode 14 along the travel-path 26 so, for example, how smoothly or efficiently the operator 16 operates the host-vehicle 12 can be compared to how smoothly or efficiently the controller 20 operates the host-vehicle 12 along the same or similar section of the travel-path 26. If the travel-path 26 is relatively smooth and straight, the comparison of operation over different sections of the roadway 28 may be useful. However, if a particular section of the roadway 28 has irregular features, then the comparison of operation during the manual-mode 14 and the automated-mode 18 while traveling the same section of the roadway 28 may be necessary.

As mentioned above, the system 10 includes the controller 20 which is in communication with the accelerometer 22, typically via wires. The controller 20 may include a processor (not specifically shown) such as a microprocessor or other control circuitry such as analog and/or digital control circuitry including an application specific integrated circuit (ASIC) for processing data as should be evident to those in the art. The controller 20 may include memory 30, such as on-board memory 30A in the form of non-volatile electrically erasable programmable read-only memory (EEPROM) for storing one or more routines, thresholds, and captured data. The one or more routines may be executed by the processor to perform steps to determine a skill-score 32 based on a comparison of the acceleration-value 24 to an expected-acceleration 34 that the operator 16 and/or the host-vehicle 12 would experience when the host-vehicle 12 is operated in the automated-mode 18 along the travel-path 26. That is, the skill-score 32 is an indicator of differences in motion or movement of the host-vehicle 12 when operated in the manual-mode 14 by the operator and when operated in the automated-mode 18 by the controller 20 over the same or comparable sections of the travel-path 26 of the roadway 28.

The memory 30, which may include the on-board memory 30A and/or a remote memory 30B accessed via a transceiver 36, may be used to store the expected-acceleration 34 for the travel-path 26. In one embodiment of the system 10 the expected-acceleration 34 may be determined based on a roadway-model 38 that calculates the expected-acceleration 34 based on, for example, the radius and bank-angle of a curve, and/or a change in ramp-angle (e.g. uphill/downhill) of the travel-path 26. Alternatively, and believed to be preferable, the expected-acceleration 34 may be determined based on prior-accelerations 40 recorded in other-vehicles 42 (FIG. 2) previously operated along the travel-path 26.

While it may be preferable that the other-vehicles 42 were operated in an automated-mode so the roadway-model 38 is not the only way to determine the expected-acceleration, instances of the prior-accelerations 40 experienced by the other-vehicles 42 while being operated in a manual-mode may also be useful to make comparisons of the driving skills of the operator 16 to the driving skills of the other-operators (not shown) of the other-vehicles 42. That is, the expected-acceleration 34 may be determined from the prior-accelerations 40 experienced by the other-operators on prior travels through a particular portion, intersection, or lane of the travel-path 26, and the expected-acceleration 34 may be determined by the controller 20 and/or a remote computer in communication with the remote memory 30B, i.e. determined and stored 'in the cloud'.

By way of further example and not limitation, the skill-score 32 may start with a value of one-hundred (100) and then be increased or decreased based on subsequent comparisons of the acceleration-value 24 to the expected-acceleration 34. For example, the skill-score 32 may be decreased, indicating poor driving skills, when the operator 16 does not operate the host-vehicle smoothly. Excessive steering corrections that cause lateral accelerations, and excessive speed variation that cause longitudinal accelerations are but two examples of poor driving skills. In these two examples the skill-score 32 may be decreased because the acceleration-value 24 is greater than or exceeds the expected-acceleration 34. However, certain circumstances may require a significant steering correction and/or change in speed to, for example, avoid a collision. As such, it may be advantageous to equip the system 10 so that instances when it is justifiable for the acceleration-value 24 to exceed the expected-acceleration 34 may be detected and the skill-score properly adjusted.

To this end, the system 10 may include an object-detection-device 44 operable to detect various objects proximate to the host-vehicle 12. The object-detection-device 44 may include, but is not limited to, a camera, a radar-unit, a lidar-unit, and/or any combination thereof. Accordingly, the controller 20 may be equipped or programmed with an object-identification block 46 that can process signals from the object-detection-device 44 to distinguish, for example, the other-vehicle 42 from a pedestrian 48. Algorithms to process signals from the object-detection-device 44 for identifying or classifying objects are known to those in the art.

Figure 2:
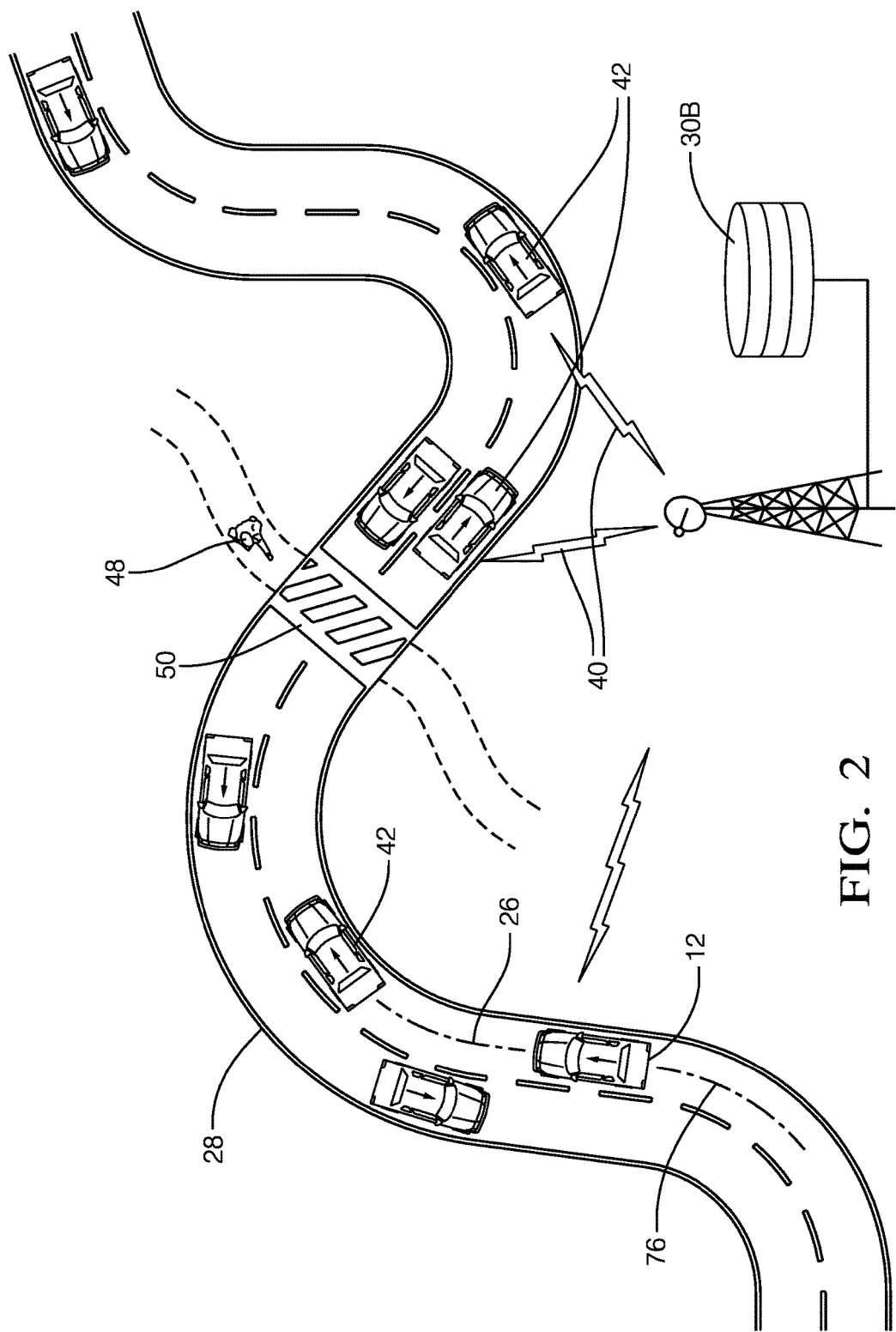
FIG. 2 is a traffic scenario encountered by the system of FIG. 1 in accordance with one embodiment.

By way of further example and in reference to FIG. 2, if the object-detection-device 44 detects the pedestrian 48 proximate to the host-vehicle 12 as the host-vehicle 12 approaches a cross-walk 50 across the travel-path 26, the operator 16 may elect to slow or stop the host-vehicle 12 to allow the pedestrian to cross the travel-path 26. The controller 20 may be preferably programmed to adjust (e.g. incrementally increase) the skill-score 32 when a pedestrian-courtesy-event 52 is detected which corresponds to an instance where actions by the operator 16 during operation in the manual-mode 14 made way for the pedestrian 48. I.e. the skill-score 32 is increased because the deceleration that influenced the acceleration-value 24 was due to being courteous to the pedestrian 48.

By way of further example, the system 10 may be further configured to use the object-detection-device 44 and/or the roadway-model 38 to determine a lane-centerline 76 of the roadway. For example, the lane-centerline 76 may be determined based on lane-markings present along the travel-path 26 that are detected by the object-detection-device 44, and the image may be processed by the object-identification block 46 to determine the lateral position of the center of a lane. Alternatively, the lane-centerline 76 of the travel-path 26 may be included in a digital map data stored in the memory 30. The skill-score 32 may be adjusted downward based on the detected lateral distance from the lane-centerline 76. I.e.—the skill-score 32 may be decreased when the operator 16 continuously drives with a non-lane-center bias, and the system 10 did not detect a valid reason for such behavior.

Like in the previous paragraph, other ways that skill scoring could be accomplished without the use of an accelerometer are contemplated. Some additional non-limiting examples include: measuring the time it takes the operator 16 to take over manual-driving of the host-vehicle 12 (i.e. operate in the manual-mode 14) from the automated-mode 18 once the system 10 has notified the operator 16 that the manual-mode 14 is needed (e.g. the skill-score 32 is decreased for long take-over time); scoring how well the operator keeps a proper gap/distance from the leading-vehicle 54 (FIG. 3) at all times; determine how often the operator 16 checks the rear-view and side-view mirrors of the host-vehicle 12 (more frequent checks increase the skill-score 32; and/or determine a state of alertness of the operator (e.g. reduce the skill-score if the operator 16 appears to be tired.

Figure 3:
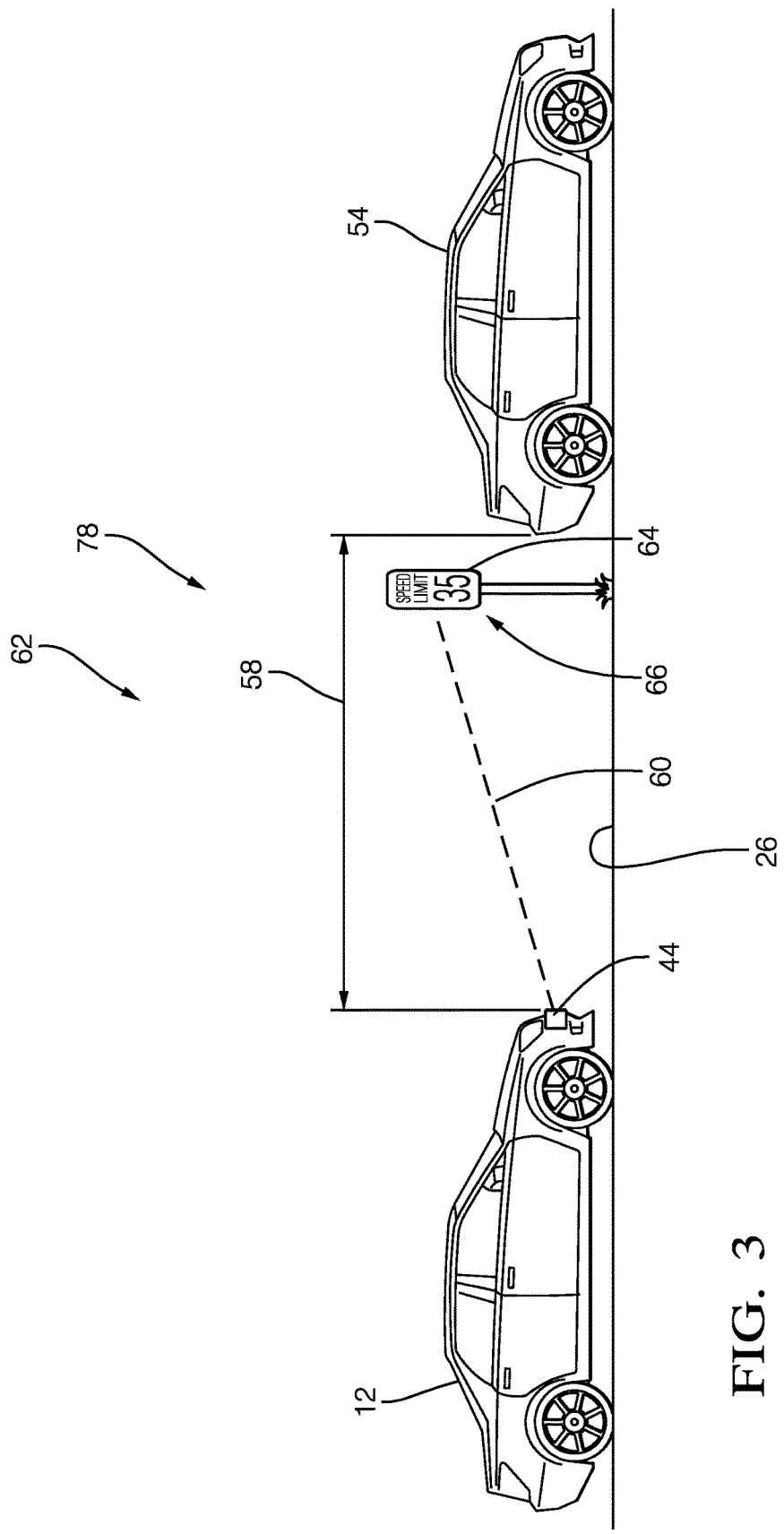
FIG. 3 is a traffic scenario encountered by the system of FIG. 1 in accordance with one embodiment.

FIG. 3 illustrates another non-limiting example of a scenario that may be experienced by the system 10 and may influence the skill-score 32. By way of further example, the object-detection-device 44 may be used to detect a leading-vehicle 54 located forward of the host-vehicle 12. The skill-score 32 may be adjusted downward or decreased when a tailgating-event 78 is detected by the controller 20, the detection of which may be based on or characterized by the host-vehicle 12 following the leading-vehicle 54 at a following-distance 56 less than a safe-distance 58 (FIG. 1). That is, the skill-score 32 may be decreased when operator 16 tailgates even though no deceleration indicated by the acceleration-value 24 was detected. The safe-distance 58 may be a variable value determined from, for example, the speed of the host-vehicle 12 and an estimate of traction available to the host-vehicle 12 from the travel-path 26.

By way of further example, the system 10 may include a speed-limit-detection-means 60. The speed-limit-detection-means 60 may be provided via the object-detection-device 44 capturing an image of a speed-limit-sign 64 adjacent the travel-path 26, and the image may be processed by the object-identification block 46 to determine a posted-speed-limit 66. Alternatively, the speed-limit of the travel-path 26 may be included in a digital map data stored in the memory 30. The skill-score 32 may be adjusted downward based on the detection of a speeding-event 62 when the controller 20 determines that the host-vehicle 12 is exceeding a posted-speed-limit 66. I.e.—the skill-score 32 may be decreased when operator 16 drives faster than the posted-speed-limit 66 even though no excessive instance of the acceleration-value 24 is detected.

Figure 4:
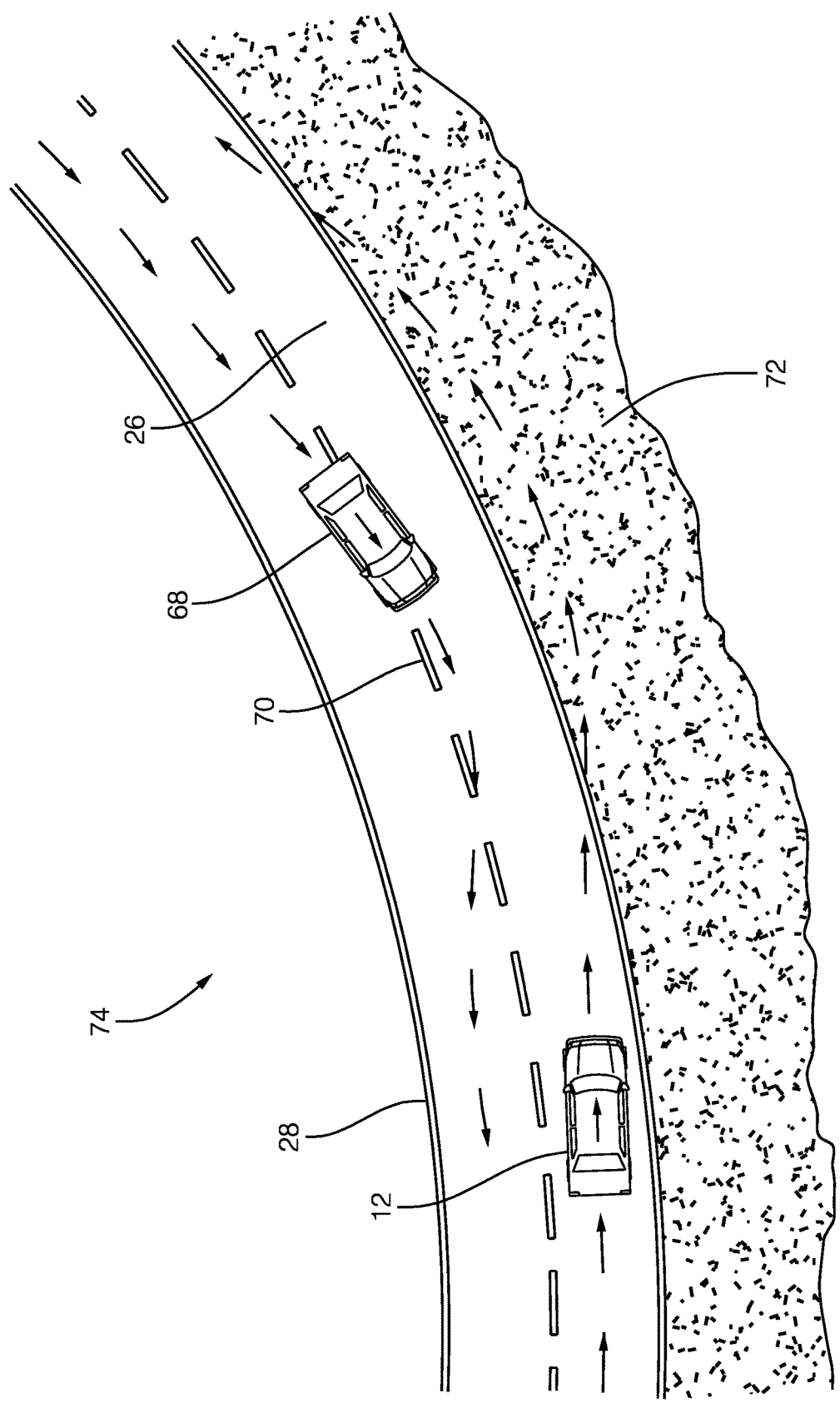
FIG. 4 is a traffic scenario encountered by the system of FIG. 1 in accordance with one embodiment.

FIG. 4 illustrates another non-limiting example of a scenario that may be experienced by the system 10 and may influence the skill-score 32. By way of further example, the object-detection-device 44 may be used to detect an approaching-vehicle 68 proximate to the host-vehicle 12, and the skill-score 32 is adjusted based on a collision-avoidance-event 74 where actions by the operator 16 during operation in the manual-mode 14 avoided a collision with the approaching-vehicle 68. The path of the approaching-vehicle 68 crossed a center-line 70 of the roadway 28 so the host-vehicle 12 had to temporarily travel on the shoulder 72 of the roadway 28 to avoid a collision with the approaching-vehicle 68. Steering onto the shoulder 72 and then back to the travel-path 26 may cause the acceleration-value 24 to increase which would normally cause a corresponding decrease in the skill-score 32. However, since the steering maneuver was effective to avoid a collision, the controller 20 may increase the skill-score if the maneuver was done in a smooth and controlled manner, or at least not change the skill-score 32 if the maneuver was not smooth. I.e.—the skill-score 32 may be increased when operator 16 successfully avoids a collision not due to the operator's own fault even though a sudden in acceleration-value 24 is detected.

Accordingly, a skill-scoring system 10, a controller 20 for the system 10 and a method of operating the system 10 is provided. As the operator 16 operates the host-vehicle 12 in the manual-mode 14, the skill-score 32 may be increased if host-vehicle 12 is operated in a smooth and well-controlled manner. However, if the operator 16 is distracted or has poor driving skills, sudden steering corrections, and/or frequent unnecessary speed changes may cause the skill-score 32 to decrease. By monitoring the skill-score 32, the operator 16 may be able to improve his/her driving skills. The skill-score 32 may become a source of pride for the operator 16 that can be shared with friends in an effort to improve the driving skills of other operators.

While this invention has been described in terms of the preferred embodiments thereof, it is not intended to be so limited, but rather only to the extent set forth in the claims that follow.

We claim:

1. A skill-scoring system suitable for use on an automated vehicle, said system comprising:

an accelerometer used to determine an acceleration-value experienced by an operator of a host-vehicle while the operator operates the host-vehicle in a manual-mode along a travel-path; and a controller in communication with the accelerometer, said controller configured to determine a skill-score based on a comparison of the acceleration-value to an expected-acceleration that the operator would experience when the host-vehicle is operated in an automated-mode along the travel-path.

2. The system in accordance with claim 1, wherein the system includes memory that stores the expected-acceleration, and the expected-acceleration is determined based on prior-accelerations recorded in other-vehicles previously operated in the automated-mode along the travel-path.

3. The system in accordance with claim 2, wherein the expected-acceleration is further determined based on prior-accelerations recorded in other-vehicles when operated in the manual-mode by other-operators during prior travel on the travel-path.

4. The system in accordance with claim 1, wherein the system includes an object-detection-device used to detect a pedestrian proximate to the host-vehicle, and the skill-score is adjusted based on a pedestrian-courtesy-event where actions by the operator during operation in the manual-mode made way for a pedestrian.

5. The system in accordance with claim 1, wherein the system includes an object-detection-device used to detect a leading-vehicle forward of the host-vehicle, and the skill-score is adjusted based on a tailgating-event characterized by the host-vehicle following the leading-vehicle at a following-distance less than a safe-distance.

6. The system in accordance with claim 1, wherein the system includes a speed-limit-detection-means, and the skill-score is adjusted based on a speeding-event characterized by the host-vehicle exceeding a posted-speed-limit.

7. The system in accordance with claim 1, wherein the system includes an object-detection-device used to detect an approaching-vehicle proximate to the host-vehicle, and the skill-score is adjusted based on a collision-avoidance-event where actions by the operator during operation in the manual-mode avoided a collision with the approaching-vehicle.

* * * * *